(12) United States Patent
Trost et al.

(10) Patent No.: US 11,654,761 B2
(45) Date of Patent: May 23, 2023

(54) ELECTRIC PROPULSION SYSTEM

(71) Applicant: Dana Heavy Vehicle Systems Group, LLC, Maumee, OH (US)

(72) Inventors: Harry W. Trost, Royal Oak, MI (US); Steven G. Slesinski, Ann Arbor, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 263 days.

(21) Appl. No.: 17/001,271

(22) Filed: Aug. 24, 2020

(65) Prior Publication Data

US 2021/0070181 A1 Mar. 11, 2021

Related U.S. Application Data (60) Provisional application No. 62/898,274, filed on Sep. 10, 2019.

(51) Int. Cl.
| | |
|---|---|
| *B60K 1/02* | (2006.01) |
| *B60W 10/02* | (2006.01) |
| *B60W 10/08* | (2006.01) |
| *B60K 17/16* | (2006.01) |
| *B60W 30/18* | (2012.01) |

(52) U.S. Cl.
CPC .............. *B60K 1/02* (2013.01); *B60K 17/16* (2013.01); *B60W 10/02* (2013.01); *B60W 10/08* (2013.01); *B60W 30/18127* (2013.01); *B60W 2510/08* (2013.01); *B60W 2520/10* (2013.01); *B60W 2710/021* (2013.01)

(58) Field of Classification Search
CPC ......... B60K 1/02; B60K 17/16; B60W 10/02; B60W 10/08
See application file for complete search history.

(56) References Cited

U.S. PATENT DOCUMENTS

| | | | | |
|---|---|---|---|---|
| 6,053,833 | A | * | 4/2000 | Masaki ................... B62M 6/55 |
| | | | | 903/910 |
| 7,479,081 | B2 | * | 1/2009 | Holmes .................... B60K 6/40 |
| | | | | 475/5 |
| 8,453,770 | B2 | | 6/2013 | Tang |
| 9,463,789 | B2 | * | 10/2016 | Okuda ................... B60K 6/445 |
| 9,499,049 | B2 | | 11/2016 | Boot et al. |
| 10,220,726 | B2 | | 3/2019 | Zing et al. |
| 2009/0152030 | A1 | | 6/2009 | Palatov |
| 2018/0281776 | A1 | | 10/2018 | Pandit et al. |
| 2018/0339583 | A1 | * | 11/2018 | Hirai ....................... B60K 11/04 |
| 2019/0039592 | A1 | | 2/2019 | Simonini et al. |
| 2019/0061504 | A1 | | 2/2019 | Bassis |
| 2021/0291643 | A1 | * | 9/2021 | Marechal ................. B60K 1/02 |

\* cited by examiner

*Primary Examiner* — Erin D Bishop
(74) *Attorney, Agent, or Firm* — McCoy Russell LLP (57) ABSTRACT

Methods and systems related to electric propulsion. An electric propulsion system, in one example, includes a first electric machine coupled to a first gear set with a first gear ratio, a second electric machine coupled to a second gear set with a second gear ratio different from the first gear ratio, and an axle including an axle interface. In the system, at least a first output gear of the first gear set and a second output gear of the second gear set are coupled in parallel to the axle interface.

16 Claims, 4 Drawing Sheets

ELECTRIC PROPULSION SYSTEM

CROSS-REFERENCE TO RELATED APPLICATIONS

This application claims priority to U.S. Provisional Application No. 62/898,274 entitled "ELECTRIC PROPULSION SYSTEM," filed Sep. 10, 2019, the entire contents of which is hereby incorporated by reference in its entirety for all purposes.

TECHNICAL FIELD

The invention generally relates to a system and method for vehicle electric propulsion. More particularly, the invention relates an electric propulsion system with multiple electric machines and a method for operation of said system.

BACKGROUND AND SUMMARY

Some vehicles have deployed electric axles and other electric motor arrangements to deliver and/or augment drive to vehicle wheels. Multi-speed transmissions in electric axle and other electric drivetrain arrangements provide speed conversion functionality in certain vehicles. Multi-speed transmissions may enable the electric motor to operate more efficiently over a wider range of operation conditions in comparison to single speed transmissions. However, multi-speed transmissions introduce complexity into the drivetrain and may increase vehicle weight and maintenance, in some cases, when compared to electric vehicles utilizing single speed transmissions.

US 2009/0152030 A1 to Palatov discloses multiple drivetrain embodiments which omit a shiftable transmission. Palatov's first drivetrain embodiment provides a dedicated electric motor for each drive wheel. Palatov teaches a second drivetrain embodiment where a single gear reduction in a drive axle provides a set speed change between two electric motors and the drive wheels.

The inventors found several issues with the drivetrains taught by Palatov. In one of Palatov's drivetrains, the motors are coupled directly to the wheels, which may diminish motor efficiency and introduce axle packaging challenges. Consequently, Palatov's drivetrain may exhibit packaging, energy efficiency, and performance constraints. Palatov discloses another drivetrain with a single gear reduction for multiple motors. The single reduction drivetrain may diminish motor efficiency, which may hamper vehicle performance, in some instances.

To address at least some of the aforementioned challenges an electric propulsion system is provided. The electric propulsion system includes, in one example, a first electric machine coupled to a first gear set with a first gear ratio. The system further includes a second electric machine coupled to a second gear set with a second gear ratio different from the first gear ratio. The system further includes an axle with an axle interface. In the system, at least a first output gear of the first gear set and a second output gear of the second gear set are coupled in parallel to the axle interface. When the propulsion system makes use of multiple electric machines paired with gear sets which have distinct ratios, electric machine efficiency may be increased, if wanted, in relation to vehicle systems with a single gear reduction coupled to multiple electric machines. Additionally, this electric propulsion system arrangement may achieve gains in startability, gradeability, and/or vehicle speed range, if desired. Coupling the electric machines and gear sets to the axle in the aforementioned arrangement may reduce the complexity of the system in comparison to multi-speed style transmissions.

In another example, the axle may include a differential and the axle interface may be a differential carrier. In this way, the gear sets may serve to transfer power directly from the electric machines to the axle's differential. The system's complexity may be further decreased, as a result of the direct torque transfer from the gear sets to the differential.

Further, in one example, the first gear ratio may correspond to a first efficiency curve of the first electric machine and the second gear ratio may correspond to a second efficiency curve of the second electric machine. In this example, the first efficiency curve is distinct from the second efficiency curve. In this way, the gear ratios of each gear set may correspond to the efficiency of the electric machine to which they are attached, thereby increasing electric machine efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An electric propulsion system with multiple electric machines, such as electric motor-generators, is described herein. The electric axle assembly includes gear reductions with distinct ratios coupled to the electric machines. The gear reductions are coupled in parallel to a differential or other suitable axle interface. The ratios of the gear sets may correlate to electric machine size and/or configuration to increase electric machine efficiency. To elaborate, in one example, the efficiency curves of the electric machines may vary and the ratios of each gear set may correlate to the electric machines. In this way, power may be concurrently transferred between two or more of the electric machines and the axles while the machines operate within desired efficiency ranges or near efficiency set-points, if so desired. Gains in startability, gradeability, and/or vehicle speed range may be derived from this propulsion system arrangement and control strategy. Further, in some embodiments, the vehicle may forgo a shiftable multi-speed transmission. Forgoing the multi-speed transmission may simplify the propulsion system, in comparison to multi-speed transmissions, while diminishing (e.g., substantially avoiding) efficiency trade-offs. The simplified system design may increase vehicle reliability and maintenance intervals, if wanted.

Figure 1:
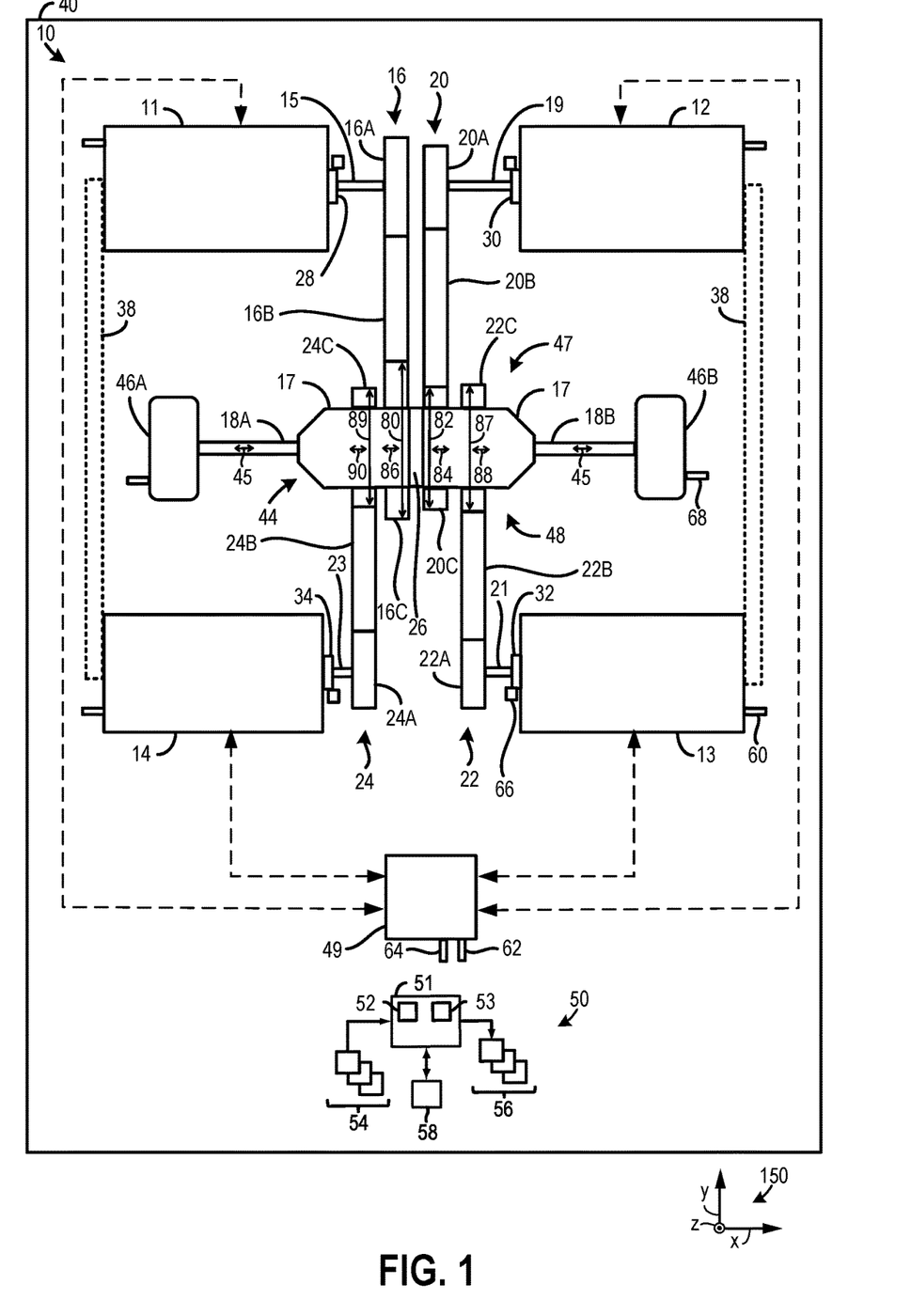
FIG. 1 shows a schematic representation of an embodiment of an electric propulsion system.

FIG. 1 shows an electric propulsion system 10 in a vehicle 40. The vehicle 40 may be a light, medium, or heavy duty vehicle. The vehicle 40 may be further configured as a battery electric vehicle (BEV), in one example, or a hybrid vehicle, in another example. Therefore, in one embodiment, the electric propulsion system 10 includes a first electric machine 11, a second electric machine 12, a third electric machine 13, and a fourth electric machine 14. It should be noted that the electric propulsion system 10 may include only two or three electric machines, in some embodiments, or more than four electric machines, in other embodiments. The electric machines may be mounted to a vehicle chassis 38, in one implementation. In other implementations, the electric machines may be mounted to an axle assembly, have their own independent suspension mounts, or otherwise be mounted on the vehicle body.

The electric machines 11, 12, 13, 14 may be designed to operate in a drive mode (e.g., a forward and/or reverse drive mode) and/or a regenerative mode. The electric machines may therefore be motor-generators, in some implementations. Both alternating current (AC) and direct current (DC) motor-generators for use in the system, have been contemplated. In the drive mode, the electric machines generate a rotational output that may be transferred to downstream component to propel the vehicle in a desired direction. In the regenerative mode, the electric machines generate brake torque and electrical energy which may be transferred to an energy storage device 49 (e.g., battery, capacitor, and the like). The electric machines may include components such as rotors, stators, magnets, and/or other conventional components to accomplish the aforementioned operating modalities.

In one embodiment, the first electric machine 11 may include a first output shaft 15. A first clutch 28 may couple to the first output shaft 15. The first clutch 28 may selectively control the rotational coupling of the first electric machine 11 to a first gear set 16. Thus, in an engaged configuration, the clutch transfers torque between the first electric machine 11 and the first gear set 16. Conversely, when the clutch is in a disengaged configuration, torque transfer between the first electric machine 11 and the first gear set 16 is inhibited. The clutch may be a ball ramp style clutch, a friction clutch, a dog clutch, etc. The first clutch 28 and the other clutches described herein may therefore be configured to continuously adjust torque transfer between the electric machine and the gear set, in one example. Thus, in the case of the friction clutch, the clutch may be placed in a plurality of engaged positions based on operating conditions, for example. However, in other examples, the clutches may be operated in discrete positions. For instance, in the case of the dog clutch, the clutch may be either engaged or disengaged. In the dog clutch embodiment, a synchronizer mechanism may be provided for speed matching during clutch engagement. However, in other examples, the first electric machine may perform speed matching during dog clutch engagement. The other clutches described herein may be any of the abovementioned clutch types. In one example, each of the clutches may share a common configuration, which may simplify system assembly and decrease manufacturing costs, in some cases. For instance, the clutches may each be a friction clutch or a dog clutch. In alternate system implementations, the system may deploy two or more clutches of varying types.

The first gear set 16 may include two or more engaging gears which exhibit a first reduction ratio. As described herein, gear engagement may denote a mesh being formed between corresponding gears which enables torque transfer between the gears. Thus, as described herein a gear may be a component including a plurality of teeth. In the illustrated embodiment, the first gear set 16 comprises three gears 16A, 16B, 16C. However, gear sets with alternate numbers of gears have been envisioned. For instance, the gear set may include two gears or more than three gears. In the depicted embodiment, the first output gear 16C engages with the gear 16B, which engages with the gear 16A. Although, other gear arrangements may be used, in other embodiments.

The gears 16A, 16B, and 16C may have a parallel arrangement. For example, the gears' rotational axes may be offset from one another. Thus, in this parallel shaft arrangement, a line or plane perpendicularly extends through the rotational axes of each gear. Other parallel type gear arrangements such as planetary gear sets with ring gears, planet gears, and sun gears, have been contemplated. In the planetary gear set embodiment, the system may achieve greater space efficiency which may increase manufacturing complexity. In some embodiments, the first reduction ratio may be 20:1. The ratio of the first gear reduction as well as the other gear reductions described herein may be selected based on electric machine characteristics such as efficiency, size, regenerative efficiency, thermodynamic properties, and the like, axle and/or differential characteristics (e.g., differential gear sizing, axle packaging, etc.), vehicle performance targets, and/or combinations thereof. For instance, in an alternate embodiment, if relatively higher speed motors are utilized, the range of the gear reduction ratios across the gear sets may be 1:1 to 10:1. However, a variety of suitable gear ratios ranges have been contemplated.

In one embodiment, the first output gear 16C of the first gear set 16 may couple to a carrier 17 of a differential 44. In another embodiment, the first output gear 16C may couple to another suitable axle interface, such as a gear coupled directly to the axle shafts. Thus, the first output gear 16C functions as an interface with an interface of the axle, in the illustrated embodiment. Coupling the first electric machine to the differential through (e.g., directly through) the gear set may provide a space efficient and reliable arrangement. It will be appreciated that the other electric machines and gear sets described herein may correspondingly achieve increased space efficiency and reliability. Specifically, in one example, coupling the electric machines to the differential via gear sets may allow the propulsion system to forgo a multi-speed transmission while diminishing or avoiding tradeoffs with regard to gear ratio adjustability, if wanted. Consequently, system compactness and reliability may be further increased. The control strategies highlighting the system's gear ratio adaptability are described in greater detail herein with regard to FIGS. 2-5.

Continuing with FIG. 1, the first output gear 16C may be a ring gear, in one embodiment. Thus, teeth on the inside of the ring gear may mesh with outer teeth on a gear of the differential 44 or other suitable axle interface. The ring gear may therefore be formed as an inner-outer toothed ring gear, for example. This gear attachment layout may be more space efficient than other gear layouts. However, in other embodiments, the first output gear 16C may be a spur, hypoid, spiral bevel, helical, double hypoid, double spiral bevel, or double helical type gear.

The differential carrier 17 may be provided as part of a differential assembly. The differential assembly may further comprise a housing, a plurality of gears (e.g., helical gears or side gear and spider gears, etc.), and the like. Thus, in one use-case, the gears may include a plurality of helical gears with axes of rotation parallel to the axle's axis of rotation. In another use-case example, the differential's gears may include at least one side gear and at least one pinion gear, although other suitable configurations are considered.

Within the differential 44, a first end of a first drive axle shaft 18A may connect to one of the side gears and a second end of a second drive axle shaft 18B may connect to another side gear in the differential 44. Each drive axle shaft 18A, 18B extends from the differential toward one of the drive wheels 46A, 46B. In one embodiment, each drive axle shaft may be arranged parallel with the first output shaft 15. Each drive axle shaft is rotatable about an axis of rotation 45. The axis of rotation of the first output gear 16C may align with the axes of rotation of the drive axle shafts 18A, 18B. In this way, the propulsion system may exhibit a compact component arrangement.

The second electric machine 12 may be provided with a second output shaft 19. In some embodiments, the first output shaft 15 and the second output shaft 19 may be coaxially aligned. The co-axial electric machine arrangement may provide a more balanced weight distribution and more efficient compact component packaging in the system in comparison to off-axis electric machine arrangements. In other embodiments, the first output shaft 15 and the second output shaft 19 may be provided in a parallel relationship. The electric machine positioning may be selected based on vehicle packaging, weight distribution, suspension kinematics, and the like. A second clutch 30 may couple to the second output shaft 19. The second clutch 30 may selectively control torque transfer between the second electric machine 12 and a second gear set 20. The second clutch 30 may be any of the previously described clutch types.

The second gear set 20 may include two or more meshing gears 20A, 20B, 20C, which exhibit a second reduction ratio. In some embodiments, the second reduction ratio may be 13:1. However, the system may utilize other suitable ratios which may be determined based on the previously mentioned factors.

In one embodiment, a second output gear 20C may couple to the differential carrier 17. Further, in one embodiment, the second output gear 20C may be a ring gear. In other embodiments, the second output gear 20C may be a spur, hypoid, spiral bevel, helical, double hypoid, double spiral bevel, or double helical type gear. In one example, each of the output gears in the gear sets may be of a common type of gear. In this way, the system may realize greater simplicity, which may increase reliability as well as manufacturing and repair efficiency. In an alternate example, two or more of the output gears may be of a different gear type, which may increase manufacturing complexity.

As illustrated in FIG. 1, in some embodiments, the second output gear 20C may be spaced apart from the first output gear 16C. Further, in one embodiment, an outer diameter 80 of the first output gear 16C may be greater than an outer diameter 82 of the second output gear 20C. The second output gear 20C has an axis of rotation 84. The axis of rotation of the second output gear 20C may align with an axis of rotation 86 of the first output gear 16C. To elaborate, the gears in the first gear set 16 may have a parallel arrangement with the gear in the second gear set 20. Thus, the first and second gear sets deliver or receive torque to/from the differential in parallel but are rotationally coupled to distinct electric machines.

In further embodiments, the third electric machine 13 may be provided with a third output shaft 21. A third clutch 32 may couple to the third output shaft 21. The third clutch 32 may selectively control disconnect functionality of the third electric machine 13 and may be one of the previously described clutch types. The third gear set 22 may include multiple engaging gears 22A, 22B, 22C, which exhibit a third reduction ratio. In some embodiments, the third reduction ratio may be 11:1. However, other suitable gear ratios have been envisioned.

In one embodiment, the third gear set 22 may include a third output gear 22C coupled to the differential carrier 17. In some embodiments, the third output gear 22C may be a ring gear. In other embodiments, the third output gear 22C may be a spur, hypoid, spiral bevel, helical, double hypoid, double spiral bevel, or double helical type gear.

In some embodiments, the third output gear 22C may be spaced apart from the first output gear 16C. Further, in one embodiment, the outer diameter 80 of the first output gear 16C may be greater than an outer diameter 87 of the third output gear 22C. The third output gear 22C has an axis of rotation 88. The axis of rotation 88 of the third output gear 22C may align with the axis of rotation 86 of the first output gear 16C. As illustrated, the first and second electric machines 11, 12 are arranged on a first longitudinal side 47 of the differential 44 and the second and third electric machines 13, 14 are positioned on a second longitudinal side 48 of the differential opposite the first side. This opposing machine arrangement may increase system packaging efficiency, which allows the system's applicability to be expanded, if desired. Conversely, system arrangements with the electric machines on one of the longitudinal sides of the differential may be used, owing at least in part to end-use packaging goals, vehicle weight distribution targets, etc., in some embodiments.

In one embodiment, the fourth electric machine 14 may be provided with a fourth output shaft 23. In some embodiments, the fourth output shaft 23 and the third output shaft 21 may be coaxially aligned. In other embodiments, the third output shaft 21 and the fourth output shaft 23 may be arranged in parallel. A fourth clutch 34 may couple to the fourth output shaft 23, which may selectively control torque transfer between the fourth electric machine 14 and a fourth gear set 24. The fourth gear set 24 may include multiple meshing gears 24A, 24B, 24C to provide a fourth reduction ratio. In some embodiments, the fourth reduction ratio may be 9:1, although numerous ratios are possible.

In one embodiment, the fourth gear set 24 may include a fourth output gear 24C that may couple to the differential carrier 17. In some embodiments, the fourth output gear 24C may be a ring gear. The fourth output gear 24C may, in other embodiments, be a spur, hypoid, spiral bevel, helical, double hypoid, double spiral bevel, or double helical type gear.

In one embodiment, the fourth output gear 24C may be spaced apart from the third output gear 22C. Further, in one embodiment, an outer diameter 87 of the third output gear 22C may be greater than an outer diameter 89 of the fourth output gear 24C. The fourth output gear 24C has an axis of rotation 90. Therefore, in one implementation, the sizing of the outer diameters of the output gears from largest to smallest may be as follows: first output gear 16C, third output gear 22C, second output gear 20C, and fourth output gear 24C, although numerous gear sizing arrangement are possible. The axis of rotation 90 of the fourth output gear 24C may align with an axis of rotation 86 of the first output gear 16C. In one embodiment, a power takeoff device may couple to one of the electric machines to power an auxiliary device. The propulsion system's adaptability may be expanded when the system utilizes a power takeoff device.

Further, in one embodiment, the differential 44 may house a helical differential assembly. Alternate types of differentials may be used in other embodiments such as an open differential, a limited slip differential, etc.

In one embodiment, a bellows style seal 26 may be provided near a central region of the differential carrier 17 to couple the axle shafts 18A, 18B, together and facilitate pressurized air flow. Additionally, the bellows seal may absorb tolerance stack-up, once assembled. In other embodiments, the bellows seal may be omitted from the system to reduce system complexity or the system may deploy additional or alternate types of seals.

A control system 50 may provide energy to the electric machines from the energy storage device 49 to achieve vehicle performance targets. More generally, the control system 50, illustrated in FIG. 1, may include at least one controller 51 with at least one processor 52 and memory 53 storing instructions executable via the processor. The controller 51 may receive various signals from sensors 54 positioned in various locations in the vehicle 40 and electric propulsion system 10. The sensors may include electric machine speed sensors 60, an energy storage device temperature sensor 62, an energy storage device state of charge sensor 64, clutch position sensors 66, wheel speed sensors 68, and the like. The controller 51 may send control signals to various actuators 56 positioned at different locations in the vehicle 40 and/or propulsion system 10. For instance, the controller 51 may send signals to an actuator in the first electric machine 11 to adjust the speed or direction of rotation of the machine's output shaft 15. The controller 51 may send commands to the first clutch 28 to trigger clutch engagement and disengagement. Thus, the other controllable components in the electric propulsion system 10 (e.g., the second electric machine 12, the third electric machine 13, the fourth electric machine 14, the clutches 30, 32, 34, and the like) may similarly function with regard to command signals and actuator adjustment. The controller 51 may send commands to other vehicle components as well as receive signals from the components indicative of the state of the components and other operating conditions. For instance, the controller 51 may receive input from an input device 58, such as an accelerator pedal, a brake pedal, a gear selector, and the like.

Specifically, in one example, the controller 51 may, during operation of the electric propulsion system 10, adjust the electric machines 11, 12, 13, 14 to provide desirable startability, gradeability, speed range (e.g., top speed), and/or efficiency targets without the use of a potentially costly and complex multi-speed transmission, if wanted. By using multiple differently sized electric machines that are connected to the axle (e.g., differential) via different gear ratios, each gear ratio may be selectively disconnected based on operating conditions, if so desired. For example, the system may disconnect the gear set with the relatively high numerical ratio when the vehicle is traveling at high speed to reduce the likelihood of (e.g., avoid) overspeeding the electric machine or to achieve efficiency gains stemming from reductions in parasitic losses. The higher numerical gear ratios may provide the low-speed efficiency and startability when compared to single speed transmissions. In one use-case example, the system may have comparatively high startability targets. In such an example, the system may operate each of the electric machines in tandem. Subsequently, after the vehicle reaches a predetermined speed (e.g., a desired higher speed), the system may disconnect the gear set(s) with the higher gear ratio(s) to avoid overspeeding the electric machines, if wanted. Furthermore, the controller 51 may transition the electric machine between drive and regenerative modes based on vehicle operating conditions. The machine's modal control strategies are discussed in greater detail herein.

An axis system 150 is provided in FIG. 1, for reference. The z-axis may be a vertical axis, the x-axis may be a lateral axis, and/or the y-axis may be a longitudinal axis, in one example. However, the axes may have other orientations, in other examples.

Figure 2:
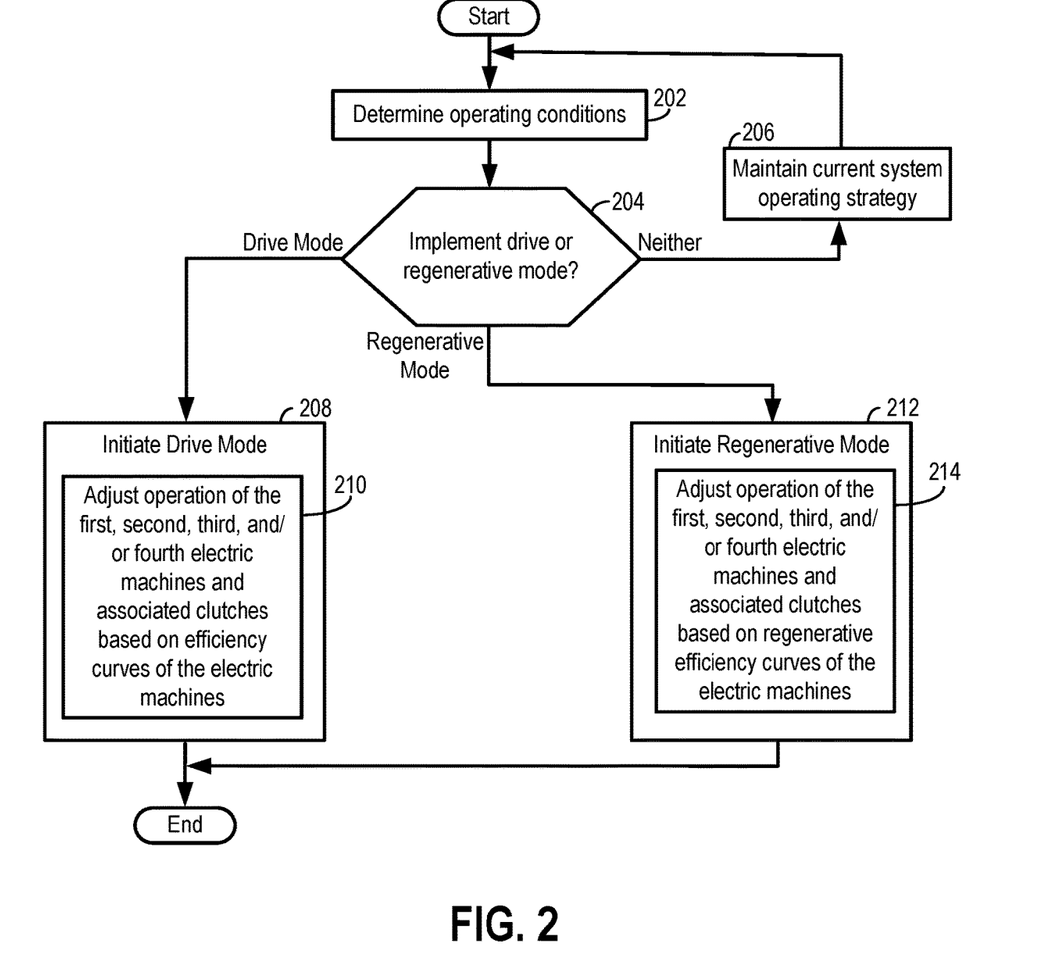
FIG. 2 shows a method for operation of an electric propulsion system.

FIG. 2 depicts a method 200 for operation of an electric propulsion system. The method 200 may be carried out via the electric propulsion system 10, illustrated in FIG. 1. In other examples, the method 200 may be implemented by other suitable electric propulsion systems. The steps in the method 200 may be stored as instructions in non-transitory memory of a controller, such as the controller 51, shown in FIG. 1, executable via a processor of the controller.

At 202, the method comprises determining operating conditions. The operating conditions may include but are not limited to vehicle speed, vehicle load, electric machine speed, electric machine temperature, ambient temperature, accelerator pedal position, brake pedal position, and the like. The operating conditions may be determined based on sensor inputs and/or modeling algorithms, for example.

At 204, the method determines whether to implement a drive or regenerative mode of operation. The drive mode may be a forward or reverse drive mode where one or more of the electric machines transfers power to the drive wheels. On the other hand, in the regenerative mode, power is transferred from the drive wheels to one or more of the electric machines. In turn, in the regenerative mode, the electric machines generate electric energy which may be transferred to the energy storage device. The decision to initiate the drive or regenerative modes may take place based on throttle position, accelerator pedal position, brake pedal position, vehicle speed, vehicle load, and the like. Propulsion system control strategy may employ various modal entry conditions such as accelerator pedal position, brake pedal position, vehicle speed, vehicle load, electric machine temperature, and/or energy storage device state of charge. For instance, the propulsion system may implement the drive mode in responsive to tip-in and the regenerative mode in response to tip-out, in one implementation. In other implementations, the propulsion system may initiate the regenerative mode in response to tip-out and/or brake pedal depression. In additional or alternative implementations, automated speed control (e.g., cruise control) strategies may initiate entry into the drive or regenerative modes. However, numerous control strategies are possible and may be influenced by end-use design goals.

If a determination is made to forgo or delay the transition between or into the drive or regenerative mode, the method moves to 206. At 206, the method includes maintaining the electric propulsion system's current operating strategy. For instance, the propulsion system may be maintained in a state of shut-down, the regenerative mode, or the drive mode.

If entry conditions for the drive mode are satisfied, the method proceeds to 208 where the method includes initiating the drive mode in the propulsion system. Initiating the drive mode includes adjusting operation of the first, second, third, and/or fourth electric machines and associated clutches based on efficiency curves of the electric machines at 210. In this way, the electric machines and clutches may be managed to achieve target vehicle performance characteristics. For instance, each of the electric machines may have a different efficiency curve. Thus, drive mode electric machine control may be carried out using target operating speed ranges on the efficiency curves. Due to variance in gear reductions paired with each electric machine, each electric machine may be maintained within or near a desired speed range while transferring varying amount of torque to the differential. In this way, the propulsion system may achieve greater efficiency, if wanted.

In one example, if operating conditions shift one of the electric machines outside the desired speed range, the electric machine may be disconnected and/or the electric machines may be jointly adjusted to bring the electric machine back into the desired range. Managing operation of the clutches may include coordinating clutch engagement and disengagement to activate and deactivate a corresponding electric machine. Managing operation of the electric machines may further include jointly adjusting machine speed to achieve targeted vehicle performance characteristics. For instance, the plurality of electric machines may be operated at distinct speeds to influence vehicle acceleration, deceleration, starting operation, and other performance characteristics. Thus, during certain periods of drive mode operation, a first set of the electric machines may be operational and a second set of the electric machines may be deactivated. During other periods of drive mode operation, each of the electric machines may be operational.

If entry conditions for the regenerative mode are satisfied, the method proceeds to 212 where the method includes initiating a regenerative mode of operation. Initiating the regenerative mode of operation includes, at 214, adjusting operation of the first, second, third, and/or fourth electric machines and associated clutches based on regenerative efficiency curves of the electric machines. For instance, the electric machines may each have a distinct regenerative efficiency curve. Thus, regenerative mode electric machine control may be carried out using target operating speed ranges on the regenerative efficiency curves. To elaborate, in one regenerative mode operating strategy, selected clutches may be engaged and the associated electric machine may turn braking energy into electrical power. Thus, in one use-case example, clutch engagement and/or motor braking may be modulated to maintain the one or more of the electric machines within the targeted range on the regenerative efficiency curve. For instance, a first portion of electric machines may be operated in a regenerative mode while another portion of the electric machines may be disengaged from the gear sets using the corresponding clutches, to achieve desired regenerative mode targets. Still further in another use-case, each of the electric machines may operate in the regenerative mode for a selected duration, during conditions when higher brake torque is demanded. Consequently, the propulsion system's efficiency may be further increased, if so desired.

The regenerative efficiency curves may be different from the efficiency curved utilized for electric machine control in the drive mode. In this way, electric machine control may be tailored to the system's operating mode to increase electric machine and more generally system efficiency.

Figure 3:
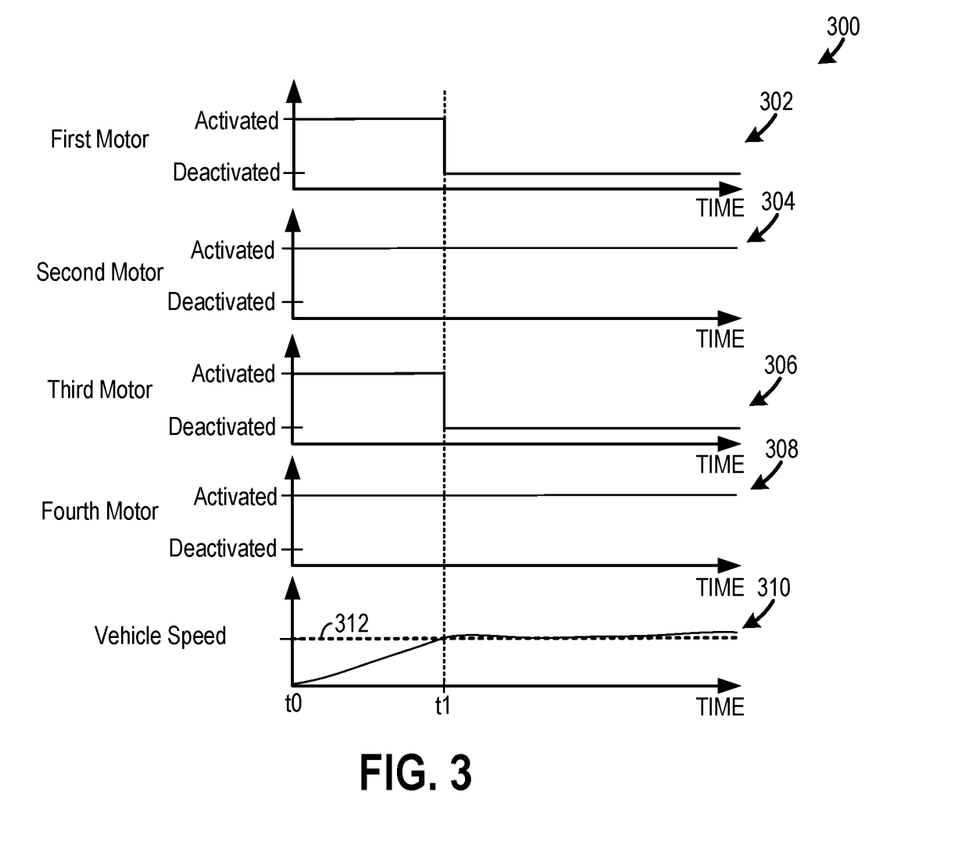
FIG. 3 shows a graphical depiction of a use-case electric propulsion system control strategy.

FIG. 3 shows a diagrammatic representation 300 of a use-case operating strategy for an electric propulsion system. In particular, diagram 300 shows a series of plots 302, 304, 306, and 308, which indicate the operational states ("Activated" and "Deactivated") of the first, second, third, and fourth electric machines, respectively. Specifically, the operational states of the electric machines are indicated on the ordinates. In an electric machine's deactivated state, the clutches, coupled to the electric machines, may be disengaged to prevent torque transfer between the electric machine and associated gear set. Conversely, in an electric machine's activated state, the clutches, coupled to the electric machines, may be engaged to allow for torque transfer between the electric machine and associated gear set. Vehicle speed in indicated on the ordinate of plot 310. The specific control schemes for the electric machines may be more nuanced, in practice. For instance, the speed of the electric machines may be granularly adjusted based on a variety of operating conditions such as pedal position, energy storage device state of charge, vehicle speed, electric machine temperature, and the like. In each plot, time is indicated on the abscissa, which increases from left to right. The vertical dashed line, at t1, indicates a relative point of interest in time.

From t0 to t1, the first, second, third, and fourth electric machines are activated and deliver power to the drive wheels via the differential or other suitable axle interface. Thus, during electric machine activation, the associated clutches may be engaged. In this way, the electric machines may be jointly operated to quickly bring the vehicle up to a desired speed, which may increase operator satisfaction. Put another way, the electric machines may transmit power to the differential when the vehicle speed is less than a threshold value.

At t1, the vehicle speed surpasses a threshold 312 (e.g., set-point such as 30 kilometers per hour (km/h), 40 km/h, 50 km/h, etc.). The threshold 312 may correlate to pedal position or a cruise control input, for instance. The first and third electric machines may be deactivated when the speed threshold is surpassed. Put another way, the transmission of power from the electric machines to the differential may be discontinued when the vehicle speed surpasses the threshold value. System efficiency gains may result from this deactivation, which increases vehicle range.

Figure 4:
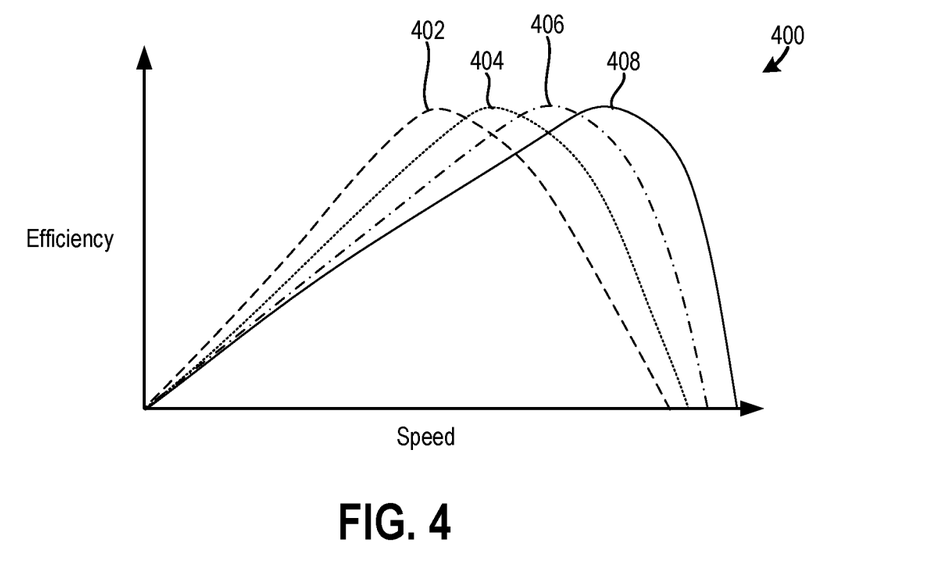
FIG. 4 shows graphs of electric machine efficiency in a drive mode, in one use-case embodiment.

FIG. 4 shows a diagram 400 illustrating exemplary electric machine efficiency curves. As described herein, exemplary does not denote any sort of preference but rather indicates one of many possible facets of the system and method described herein. The efficiency curves may be deployed in any of the electric machine drive mode control strategies described herein. Thus, the efficiency curves may correspond to the electric machines described above with regard to FIGS. 1, 2, and/or 3 or other suitable electric machines. It will be understood that the efficiency curves serve merely as examples of possible efficiency plots. Therefore, the electric machine efficiency curves may vary based on a variety of electric machine characteristics such as machine size, machine type, machine thermodynamic properties, and the like. In each plot, electric machine efficiency in a drive mode is indicated on the ordinate, which increases from bottom to top. Further, in each plot, speed is indicated on the abscissa, which increases from left to right.

Plot 402 indicates an efficiency curve of the first electric machine and plot 404 indicates an efficiency curve of the third electric machine. Plot 406 indicates an efficiency curve of the second electric machine and plot 408 indicates an efficiency curve of the fourth electric machine. Electric machine control may be managed to sustain machine speed in a targeted range to hold the electric machine's efficiency above a threshold value (e.g., 70% efficiency, 75% efficiency, 80%, efficiency, etc.) or within a desired range (e.g., 70%-95% efficiency, 75%-98% efficiency, 80%-90% efficiency, etc.) in some control schemes. In one particular example, each of the operational electric machines may be operated in a targeted efficiency range. In other examples, a portion of the operational electric machines may be operated in the targeted efficiency range. This electric machine speed control strategy constructively influences various facets of vehicle performance such as startability, gradeability, and/or vehicle speed range. Thus, one or more of the aforementioned vehicle performance characteristics may be increased due to the constructive influence of the control strategy, if so wanted. Increasing the vehicle performance characteristics may boost customer appeal.

Figure 5:
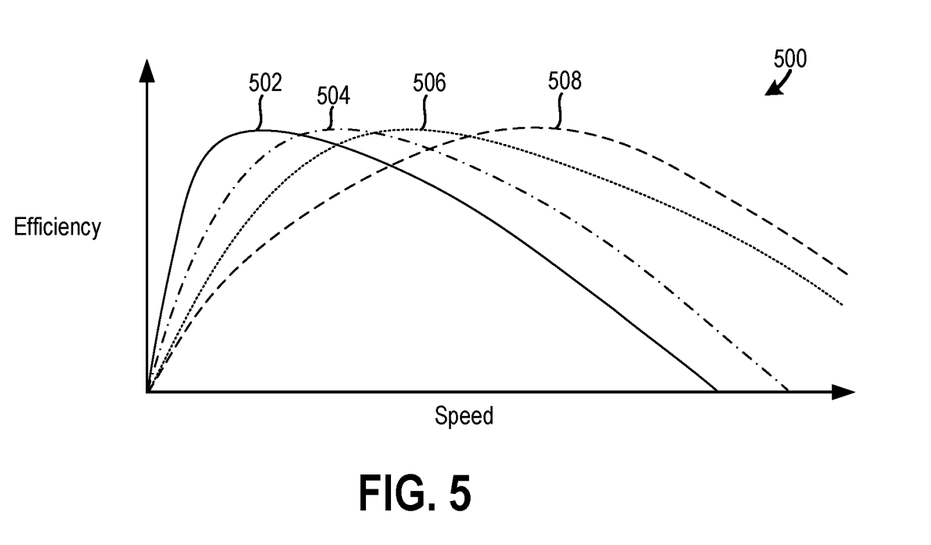
FIG. 5 shows graphs of electric machine regenerative efficiency in a regenerative mode, in another use-case embodiment.

FIG. 5 shows a diagram 500 illustrating exemplary regenerative efficiency curves. The regenerative efficiency curves indicate the energy recovery efficiencies of the electric machines to which they correspond. The regenerative efficiency curves may be used in electric machine regenerative mode control strategies. Thus, the regenerative efficiency curves may correspond to the electric machines described above with regard to FIGS. 1, 2, and/or 3 or other suitable electric machines. In each plot, machine regenerative efficiency is indicated on the ordinate which increases from bottom to top. Further, in each plot, speed is indicated on the abscissa, which increases from left to right.

Plot 502 denotes a regenerative efficiency curve of the first electric machine and plot 504 denotes a regenerative efficiency curve of the third electric machine. Plot 506 denotes a regenerative efficiency curve of the second electric machine and plot 508 denotes a regenerative efficiency curve of the fourth electric machine. Electric machine control may be managed, during regenerative operation, such that the electric machine speed may be kept in a desired range to maintain the machine's regenerative efficiency above a desired value (e.g., 70% conversion efficiency, 80% conversion efficiency, 90% conversion efficiency, etc.) or within a targeted range (e.g., 70%-95% conversion efficiency, 60%-90% conversion efficiency, 80%-95% conversion efficiency, etc.). This regenerative control strategy may be implemented in one or more of the electric machines and in some cases each of the operational electric machines.

The technical effect of the electric propulsion system and control method described herein is to increase system efficiency, simplicity, and/or longevity while potentially reducing the likelihood of component degradation. Facets of vehicle performance such as startability, gradeability, and/or vehicle speed range may be increased through the use of the electric propulsion system and method for operation of the system described herein.

FIG. 1 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, an electric propulsion system is provided that comprises a first electric machine coupled to a first gear set with a first gear ratio; a second electric machine coupled to a second gear set with a second gear ratio different from the first gear ratio; and an axle including an axle interface; wherein at least a first output gear of the first gear set and a second output gear of the second gear set are coupled in parallel to the axle interface.

In another aspect, a method for operation of an electric propulsion system is provided, the method comprises managing adjustment of a first electric machine, a first clutch, a second electric machine, and a second clutch based on operating efficiencies of the first electric machine and the second electric machine, wherein the electric propulsion system comprises: the first electric machine coupled to a first gear set with a first gear ratio; the second electric machine coupled to a second gear set with a second gear ratio different from the first gear ratio; the first clutch coupled to the first electric machine and the first gear ratio; and the second clutch coupled to the second electric machine and the second gear ratio; and an axle including a differential coupled to at least a first output gear of the first gear set and a second output gear of the second gear set. In one example, the method may further comprise transmitting power to the differential from the first electric machine and the second electric machine when vehicle speed is less than a threshold value; and discontinuing the transmission of power to the differential from the first electric machine or the second electric machine when the vehicle speed surpasses the threshold value. In another example, the method may further comprise while the electric propulsion system is operating in a regenerative mode, managing adjustment of the first and second clutches and the first and second electric machines based on energy recovery efficiencies of the first and second electric machines; wherein the energy recovery efficiencies are dissimilar to the operating efficiencies of the first and second electric machines.

In yet another aspect, an electric axle system is provided that comprises a first electric motor-generator coupled to a first gear set with a first gear ratio; a second electric motor-generator coupled to a second gear set with a second gear ratio different from the first gear ratio; an axle differential including a differential carrier coupled in parallel to at least a first output gear of the first gear set and a second output gear of the second gear set; a first clutch coupled to the first electric motor-generator and the first gear set; and a second clutch coupled to the second electric motor-generator and the second gear set.

In any of the aspects or combinations of the aspects, the axle may include a differential and wherein the axle interface is a differential carrier.

In any of the aspects or combinations of the aspects, first electric machine may be a first electric motor-generator and the second electric machine may be a second electric motor-generator.

In any of the aspects or combinations of the aspects, the first gear ratio may correspond to a first efficiency curve of the first electric motor-generator; and the second gear ratio may correspond to a second efficiency curve of the second electric motor-generator; the first efficiency curve may be different from the second efficiency curve.

In any of the aspects or combinations of the aspects, the electric propulsion system may further comprise a first clutch coupled to the first electric machine and the first gear set; and a second clutch coupled to the second electric machine and the second gear set.

In any of the aspects or combinations of the aspects, the electric propulsion system may further comprise a controller including executable instructions stored in non-transitory memory that, during operation of the electric propulsion system in a drive mode, cause the controller to: manage adjustment of the first and second clutches and the first and second electric machines based on operating efficiencies of the first and second electric machines; wherein the operating efficiencies of the first and second electric machines may be dissimilar.

In any of the aspects or combinations of the aspects, the controller may include executable instructions stored in the non-transitory memory that, during operation of the electric propulsion system in a regenerative mode, cause the controller to: manage adjustment of the first and second clutches and the first and second electric machines based on energy recovery efficiencies of the first and second electric machines; the energy recovery efficiencies may be dissimilar to the operating efficiencies of the first and second electric machines.

In any of the aspects or combinations of the aspects, managing adjustment of the first and second clutches may include engaging or sustaining engagement of the first and second clutches when vehicle speed is less than a threshold value and disengaging at least one of the first and second clutches when the vehicle speed surpasses the threshold value.

In any of the aspects or combinations of the aspects, the electric axle system may further comprise a controller which may include: executable instructions stored in non-transitory memory that, during a first operating condition, cause the controller to: manage adjustment of the first and second clutches and the first and second electric motor-generators based on operating efficiencies of the first and second electric motor-generators; wherein the operating efficiencies of the first and second electric motor-generators are dissimilar; and executable instructions stored in the non-transitory memory that, during a second operating condition, cause the controller to: vary the adjustment of the first and second clutches and the first and second electric motor-generators based on energy recovery efficiencies of the first and second electric motor-generators.

In any of the aspects or combinations of the aspects, the electric axle system may further comprise a controller which may include including: executable instructions stored in non-transitory memory that, during an operating condition, cause the controller to: disconnect the first electric motor-generator or the second electric motor-generator through operation of the first clutch or the second clutch based on vehicle speed.

In any of the aspects or combinations of the aspects, the electric axle system may further comprise a third electric motor-generator coupled to a third gear set with a third gear ratio; a fourth electric motor-generator coupled to a fourth gear set with a fourth gear ratio; a third clutch coupled to the third electric motor-generator and the third gear set; and a fourth clutch coupled to the fourth electric motor-generator and the fourth gear set; wherein the first, second, third, and fourth gear ratios may not be equivalent; and wherein the differential carrier may be coupled to at least a third output gear of the third gear set and a fourth output gear of the fourth gear set.

In any of the aspects or combinations of the aspects, the first gear set and the second gear set may each be a parallel axis gear set.

In any of the aspects or combinations of the aspects, the electric axle system may further comprise a controller including: executable instructions stored in non-transitory memory that, during an operating condition, cause the controller to: disconnect the first or second electric motor-generator through operation of the first or second clutch based on vehicle speed.

In any of the aspects or combinations of the aspects, the electric axle system may further comprise a third electric motor-generator coupled to a third gear set with a third gear ratio; a fourth electric motor-generator coupled to a fourth gear set with a fourth gear ratio; a third clutch coupled to the third electric motor-generator and the third gear set; and a fourth clutch coupled to the fourth electric motor-generator and the fourth gear set; wherein the first, second, third, and fourth gear ratios are not equivalent; wherein the differential carrier may be coupled to at least a third output gear of the third gear set and a fourth output gear of the fourth gear set; and wherein the third electric motor-generator may be coaxially arranged with the fourth motor-generator.

In any of the aspects or combinations of the aspects, the first and second gear sets may each include a plurality of helical gears.

In any of the aspects or combinations of the aspects, the first and second gear sets may be planetary gear sets.

In another representation, a vehicle drivetrain is provided that includes four motors coupled to a differential case via four unequally sized gears, wherein the axes of rotation of the differential case and the four gears are co-axial, wherein the four motors each have a distinct operating efficiency curve.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken to change a state of a device. The specific routines described herein may represent one or more of a variety of processing strategies. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various vehicle hardware components in combination with the electronic controller. One or more of the method steps described herein may be omitted if desired.

The configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

As used herein, the terms "substantially" is construed to mean plus or minus five percent of the range unless otherwise specified.

The systems and methods described herein may assume various alternative orientations and step sequences, except where expressly specified to the contrary. It is also to be understood that the assemblies, devices, and methods illustrated in the attached drawings, and described in the preceding specification are simply exemplary embodiments. Hence, specific dimensions, directions, or other physical characteristics relating to the embodiments disclosed are not to be considered as limiting, unless expressly stated otherwise.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention as defined by the claims which follow.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric propulsion system, comprising:
a first electric machine coupled to a first gear set with a first gear ratio;
a second electric machine coupled to a second gear set with a second gear ratio different from the first gear ratio;
an axle including an axle interface;
a third electric machine coupled to a third gear set with a third gear ratio; and
a fourth electric machine coupled to a fourth gear set with a fourth gear ratio;
wherein at least a first output gear of the first gear set and a second output gear of the second gear set are coupled in parallel to the axle interface;
wherein the first, second, third, and fourth gear ratios are not equivalent; and
wherein the axle interface is coupled to at least a third output gear of the third gear set and a fourth output gear of the fourth gear set.

2. The electric propulsion system of claim 1, wherein the axle includes a differential and wherein the axle interface is a differential carrier.

3. The electric propulsion system of claim 1, wherein the first electric machine is a first electric motor-generator and the second electric machine is a second electric motor-generator.

4. The electric propulsion system of claim 3, wherein the first gear ratio corresponds to a first efficiency curve of the first electric motor-generator; the second gear ratio corresponds to a second efficiency curve of the second electric motor-generator; and the first efficiency curve is different from the second efficiency curve.

5. The electric propulsion system of claim 1, further comprising a first clutch coupled to the first electric machine and the first gear set; and a second clutch coupled to the second electric machine and the second gear set.

6. The electric propulsion system of claim 5, further comprising a controller including executable instructions stored in non-transitory memory that, during operation of the electric propulsion system in a drive mode, cause the controller to manage adjustment of the first and second clutches and the first and second electric machines based on operating efficiencies of the first and second electric machines; wherein the operating efficiencies of the first and second electric machines are dissimilar.

7. The electric propulsion system of claim 6, wherein the controller includes executable instructions stored in the non-transitory memory that, during operation of the electric propulsion system in a regenerative mode, cause the controller to; manage adjustment of the first and second clutches and the first and second electric machines based on energy recovery efficiencies of the first and second electric machines; wherein the energy recovery efficiencies are dissimilar to the operating efficiencies of the first and second electric machines.

8. The electric propulsion system of claim 6, wherein managing adjustment of the first and second clutches includes engaging or sustaining engagement of the first and second clutches when vehicle speed is less than a threshold value and disengaging at least one of the first and second clutches when the vehicle speed surpasses the threshold value.

9. The electric propulsion system of claim 1, wherein the first gear set and the second gear set are parallel axis gear sets.

10. A method for operation of an electric propulsion system, the method comprising:
managing adjustment of a first electric machine, a first clutch, a second electric machine, and a second clutch based on operating efficiencies of the first electric machine and the second electric machine, wherein the electric propulsion system comprises
the first electric machine coupled to a first gear set with a first gear ratio;
the second electric machine coupled to a second gear set with a second gear ratio different from the first gear ratio;
the first clutch coupled to the first electric machine and the first gear ratio;
the second clutch coupled to the second electric machine and the second gear ratio; and
an axle including a differential coupled to at least a first output gear of the first gear set and a second output gear of the second gear set;
wherein the operating efficiencies of the first and second electric machines include efficiency curves associated with the first gear ratio and the second gear ratio.

11. The method of claim 10, further comprising transmitting power to the differential from the first electric machine and the second electric machine when vehicle speed is less than a threshold value; and discontinuing the transmission of power to the differential from the first electric machine or the second electric machine when the vehicle speed surpasses the threshold value.

12. The method of claim 10, further comprising:
while the electric propulsion system is operating in a regenerative mode, managing adjustment of the first and second clutches and the first and second electric machines based on energy recovery efficiencies of the first and second electric machines;
wherein the energy recovery efficiencies are dissimilar to the operating efficiencies of the first and second electric machines.

13. An electric axle system, comprising:
a first electric motor-generator coupled to a first gear set with a first gear ratio;
a second electric motor-generator coupled to a second gear set with a second gear ratio different from the first gear ratio;
an axle differential including a differential carrier coupled in parallel to at least a first output gear of the first gear set and a second output gear of the second gear set;
a first clutch coupled to the first electric motor-generator and the first gear set;
a second clutch coupled to the second electric motor-generator and the second gear set;
a controller including
executable instructions stored in non-transitory memory that, during a first operating condition, cause the controller to
manage adjustment of the first and second clutches and the first and second electric motor-generators based on operating efficiencies of the first and second electric motor-generators;
wherein the operating efficiencies of the first and second electric motor-generators are dissimilar; and
executable instructions stored in the non-transitory memory that, during a second operating condition, cause the controller to
vary the adjustment of the first and second clutches and the first and second electric motor-generators based on energy recovery efficiencies of the first and second electric motor-generators.

14. The electric axle system of claim 13, further comprising a controller including executable instructions stored in non-transitory memory that, during an operating condition, cause the controller to:
disconnect the first electric motor-generator or the second electric motor-generator through operation of the first clutch or the second clutch based on vehicle speed.

15. The electric axle system of claim 13, further comprising:
a third electric motor-generator coupled to a third gear set with a third gear ratio;
a fourth electric motor-generator coupled to a fourth gear set with a fourth gear ratio;
a third clutch coupled to the third electric motor-generator and the third gear set; and
a fourth clutch coupled to the fourth electric motor-generator and the fourth gear set;
wherein the first, second, third, and fourth gear ratios are not equivalent;
wherein the differential carrier is coupled to at least a third output gear of the third gear set and a fourth output gear of the fourth gear set; and
wherein the third electric motor-generator is coaxially arranged with the fourth motor-generator.

16. The electric axle system of claim 13, wherein the first and second gear sets each include a plurality of helical gears.

* * * * *